(12) United States Patent
Yamada

(10) Patent No.: US 12,216,637 B2
(45) Date of Patent: Feb. 4, 2025

(54) DATA MANAGEMENT SYSTEM

(71) Applicant: Scalar, Inc., Tokyo (JP)

(72) Inventor: Hiroyuki Yamada, Kamakura (JP)

(73) Assignee: Scalar, Inc., Tokyo (JP)

( * ) Notice: Subject to any disclaimer, the term of this patent is extended or adjusted under 35 U.S.C. 154(b) by 441 days.

(21) Appl. No.: 17/777,502

(22) PCT Filed: Nov. 17, 2020

(86) PCT No.: PCT/JP2020/042719
§ 371 (c)(1),
(2) Date: May 17, 2022

(87) PCT Pub. No.: WO2021/100682
PCT Pub. Date: May 27, 2021

(65) Prior Publication Data
US 2022/0405353 A1    Dec. 22, 2022

(30) Foreign Application Priority Data

Nov. 18, 2019   (JP) ................................. 2019-207639

(51) Int. Cl.
*G06F 21/62* (2013.01)
*G06F 16/23* (2019.01)
(Continued)

(52) U.S. Cl.
CPC ...... *G06F 16/2358* (2019.01); *G06F 21/6218* (2013.01); *G06F 21/64* (2013.01); *G06F 21/1088* (2023.08)

(58) Field of Classification Search
CPC .......... G06F 21/62; G06F 21/64; G06F 21/10; G06F 16/23; G06F 16/2358; G06F 21/6218; G06F 21/1088
See application file for complete search history.

(56) References Cited

U.S. PATENT DOCUMENTS

| | | | |
|---|---|---|---|
| 2005/0183072 A1* | 8/2005 | Horning | G06F 21/10 717/140 |
| 2022/0092224 A1* | 3/2022 | Yamada | G06F 21/57 |

FOREIGN PATENT DOCUMENTS

| | | | | |
|---|---|---|---|---|
| CA | 3072719 A1 | * | 2/2019 | ......... G06F 12/1408 |
| CN | 109635522 A | * | 4/2019 | ............ G06F 21/12 |

(Continued)

OTHER PUBLICATIONS

Satoshi Nakamoto, Bitcoin: A Peer-to-Peer Electronic Cash System, www.bitcoin.org, date unknown, in 9 pages.
(Continued)

*Primary Examiner* — Jayesh M Jhaveri
(74) *Attorney, Agent, or Firm* — Procopio, Cory, Hargreaves & Savitch LLP

(57) ABSTRACT

A data management system receives a status update request in which a target is specified and executes status update processing of updating a status of the target specified in the status update request. The status update processing includes transaction processing that is processing of updating first information and second information in an ACID (Atomicity, Consistency, Isolation, Durability) transactional manner. The first information is a first object group (one or more first objects) for each target. The first object is data that represents the status of the target. The second information is a second object group (one or more second objects) for each target. The transaction processing includes first processing of creating, updating, or deleting the first object corresponding to the specified target, and second processing of adding the second object including at least one of a content of the first processing and a summary of the first object to the second object group corresponding to the specified target.

4 Claims, 6 Drawing Sheets

(51) Int. Cl.
   *G06F 21/10*   (2013.01)
   *G06F 21/64*   (2013.01)

(56)           References Cited

FOREIGN PATENT DOCUMENTS

JP         6618138 B1    11/2019
WO    WO-2005111809 A1 *  11/2005  ............. G06F 21/64

OTHER PUBLICATIONS

Patent Cooperation Treaty, International Search Report, Application No. PCT/JP2020/042719, dated Jan. 28, 2021, in 5 pages.
Japanese Patent Office, Notice of Reasons for Refusal, Application No. JP 2020-570985, dated Feb. 4, 2021, in 6 pages.
Japanese Patent Office, Notice of Reasons for Refusal, Application No. JP 2020-570985, dated Mar. 22, 2021, in 8 pages.
Yamada Hiroyuki, "Transaction Management on Cassandra" cited in the Office Action for JP2020-570985, dated Mar. 30, 2021.

* cited by examiner

DATA MANAGEMENT SYSTEM

CROSS-REFERENCE TO RELATED APPLICATIONS

This application is US National Stage of International Patent Application PCT/JP2020/042719, filed Nov. 17, 2020, which claims benefit of priority from Japanese Patent Application JP2019-207639, filed Nov. 18, 2019, the contents of both of which are incorporated herein by reference.

TECHNICAL FIELD

The present invention generally relates to a data management technique.

BACKGROUND ART

In the case where a data management system requires tamper-evidence, it is conceivable to apply a distributed ledger technology to the data management system. Blockchains are known as an example of a data management system to which the distributed ledger technology is applied (e.g., NPL 1).

CITATION LIST

Non Patent Literature

[NPL 1] https://bitcoin.org/bitcoin.pdf

SUMMARY OF INVENTION

Technical Problem

There is a desire to manage data safely. Generally, as illustrated in FIG. 1A, data is stored in a DB (database).

However, since the DB does not have a mechanism for detecting whether data is tampered with, it is not always possible to safely manage the data from a malicious attack or the like.

Therefore, as illustrated in FIG. 1B, it is conceivable to adopt a method of using a blockchain for data management in order to manage the data safely.

However, since blockchains cannot update and delete data due to the characteristics of the tamper evident mechanism, it is difficult to manage privacy data and the like that have deletion requirements. In addition, blockchains have low searchability, so it may not be possible to describe applications efficiently.

Therefore, as illustrated in FIG. 1C, it is conceivable to register data in a DB 51 and register operation logs (an example of processing content) of the DB 51 in a blockchain 52, so that the update or deletion of data, improvement of searchability, and guarantee of tamper-evidence (tampering detection) can all be achieved.

However, the DB 51 and the blockchain 52 are separate data management systems. Therefore, the consistency between the DB 51 and the blockchain 52 cannot be maintained. Specifically, for example, when a failure occurs in the blockchain 52 before the DB 51 is updated and its operation log is registered in the blockchain 52, the DB 51 is updated but its operation log does not exist in the blockchain 52 in some cases. In addition, the DB 51 may be tampered with. However, the consistency between the DB 51 and the blockchain 52 is not always maintained, so that it is difficult to make distinction between the DB 51 having been tampered with and the operation log of the DB 51 failing to be registered in the blockchain 52.

The problems as described above may occur even in the case where tamper-evidence is guaranteed by a technology other than the distributed ledger technology.

Solution to Problem

A data management system receives a status update request in which a target is specified and executes status update processing of updating a status of the target specified in the status update request. The status update processing includes transaction processing that is processing of updating first information and second information in an ACID (Atomicity, Consistency, Isolation, Durability) transactional manner. The first information is a first object group for each target. The first object group is one or more first objects. The first object is data that represents the status of the target. The second information is a second object group for each target. The second object group is one or more second objects. The transaction processing includes first processing of creating, updating, or deleting the first object corresponding to the specified target, and second processing of adding the second object including at least one of a content of the first processing and a summary of the first object to the second object group corresponding to the specified target.

Advantageous Effects of Invention

It is possible to not only achieve the update or deletion of data, improvement of searchability, and guarantee of tamper-evidence but also achieve the maintenance of the consistency between the first information and the second information.

DESCRIPTION OF EMBODIMENTS

Figure 1A:
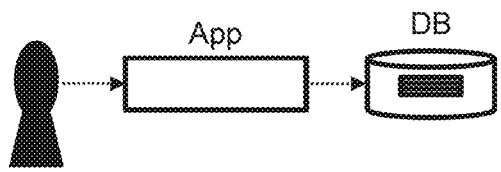
FIG. 1A illustrates an example of the problems.
Figure 1B:
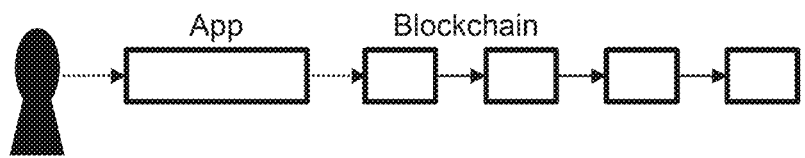
FIG. 1B illustrates an example of the problems.
Figure 1C:
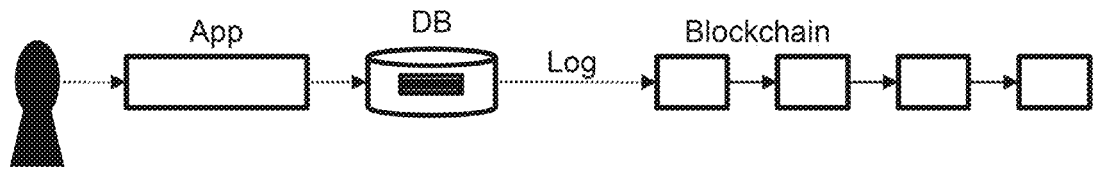
FIG. 1C illustrates an example of the problems.

In the following description, an "interface apparatus" includes one or more interfaces. The one or more interfaces may include one or more communication interface devices of the same type (e.g., one or more NICs (Network Interface Cards)) or may include two or more communication interface devices of different types (e.g., NIC and HBA (Host Bus Adapter)).

Further, in the following description, a "storage apparatus" includes one or more memories. For the storage apparatus, at least one memory may be a volatile memory. The storage apparatus is mainly used during processing by a processor. In addition to the memories, the storage apparatus may include one or more non-volatile storage devices (e.g., HDD (Hard Disk Drive) or SSD (Solid State Drive)).

Further, in the following description, a "processor" includes one or more processors. At least one of the processors is typically a microprocessor such as a CPU (Central Processing Unit). Each of the one or more processors may be of single-core or multi-core. The processor may include a hardware circuit that performs some or all processing.

Further, in the following description, processing is sometimes described with "program" as the subject, while the subject of the processing may be the processor in view of the fact that the program is executed by the processor to execute specified processing using, for example, a storage apparatus (e.g., memory) and/or an interface apparatus (e.g., a communication port) as appropriate. The processing described with the program as the subject may be processing executed by the processor or an apparatus including the processor. Further, the processor may include a hardware circuit (e.g., FPGA (Field-Programmable Gate Array) or ASIC (Application Specific Integrated Circuit)) that performs some or all processing. The program may be installed from a program source into an apparatus such as a computer. The program source may be, for example, a program distribution server or a computer-readable storage medium (e.g., a non-transitory storage medium). Further, in the following description, two or more programs may be implemented as one program, and one program may be implemented as two or more programs.

Further, in the following description, a function may be described by the expression of "yyy unit", but the function may be realized by a processor executing one or more computer programs, may be realized by one or more hardware circuits (e.g., FPGA or ASIC), or may be realized by a combination thereof. In a case where a function is realized by a processor executing the program(s), the function may be at least a part of the processor in view of the fact that specified processing is executed using a storage apparatus and/or an interface apparatus as appropriate. Processing described with a function as the subject may be processing executed by a processor or an apparatus including the processor. The description of each function is an example, and a plurality of functions may be combined into one function, or one function may be divided into a plurality of functions.

Further, in the following description, when the same type of components are described without being distinguished, a common part of reference characters may be used; when the same type of components are distinguished, full reference characters may be used.

Further, the term "record" as used in the following description refers to a block of logical electronic data in terms of a program such as an application program, and specifically, is an example of an object which is data representing a status of a target. Data as a record is, for example, a key-value pair, or a tuple.

Further, in the following description, the following term definitions are adopted.

A "target" is any tangible or intangible object. For example, the "target" can be an account and a status of the target can refer to a balance.

A "status update request" is a request for status update processing.

"status update processing" is processing for updating the status of the target.

"Mutable Record Set" is an example of the first information.

A "mutable record" is a record in Mutable Record Set and is an example of a first object.

"Tamper-evident Record Set" is an example of second information.

A "tamper-evident record" is a record in Tamper-evident Record Set and is an example of a second object.

An embodiment of the present invention will be described below.

Figure 2:
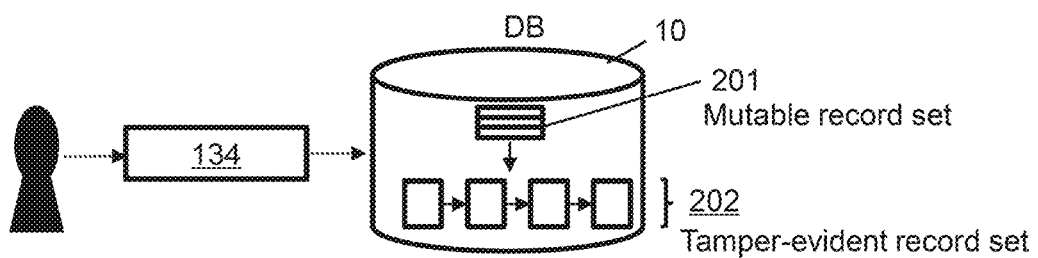
FIG. 2 illustrates the outline of an embodiment.

FIG. 2 illustrates the outline of the embodiment.

A data management system 10 receives from a client program 134 a status update request in which a target is specified and executes status update processing of updating a status of the target specified in the status update request. The status update processing includes transaction processing that is processing of updating Mutable Record Set 201 and Tamper-evident Record Set 202 in an ACID (Atomicity, Consistency, Isolation, Durability) transactional manner.

In the present embodiment, the data management system 10 is a DB, and the above-mentioned transaction processing is DB transaction processing. Note that, as the data management system in which Mutable Record Set 201 and Tamper-evident Record Set 202 are stored, a system other than the DB, for example, a file system may be adopted. In this way, Mutable Record Set 201 and Tamper-evident Record Set 202 are stored in one data management system 10, and the transaction processing is performed by the data management system 10, and in addition, at least one of the following conditions, for example, may be adopted in order to reduce the possibility of tampering even in the state where the consistency between Mutable Record Set 201 and Tamper-evident Record Set 202 is maintained.

The administrator of Mutable Record Set 201 (e.g., an organization such as a company or a department) and the administrator of Tamper-evident Record Set 202 are different.

Mutable Record Set 201 and Tamper-evident Record Set 202 are located in different geographical locations.

Mutable Record Set 201 is a mutable record group for each target. The mutable record group is one or more mutable records. The mutable record is data representing a status of the target.

Tamper-evident Record Set 202 is a tamper-evident record group for each target. The tamper-evident record group is one or more tamper-evident records. For each target, the tamper-evident record group may correspond to a ledger. For each target, the tamper-evident record group may be a time series of tamper-evident records. The detection whether a tamper-evident record is tampered with may be detection according to any method (e.g., detection using structure or detection using determinacy). In the present embodiment, detection using structure is adopted. Specifically, for example, in the present embodiment, Tamper-evident Record Set 202 is a record group forming a DAG (Directed Acyclic Graph).

The transaction processing includes first processing of creating, updating, or deleting a mutable record corresponding to a specified target, and second processing of adding a tamper-evident record including at least one of a content of the first processing and a summary of a first object to a tamper-evident record group corresponding to the specified target.

Hereinafter, the present embodiment will be described in detail.

Figure 3:
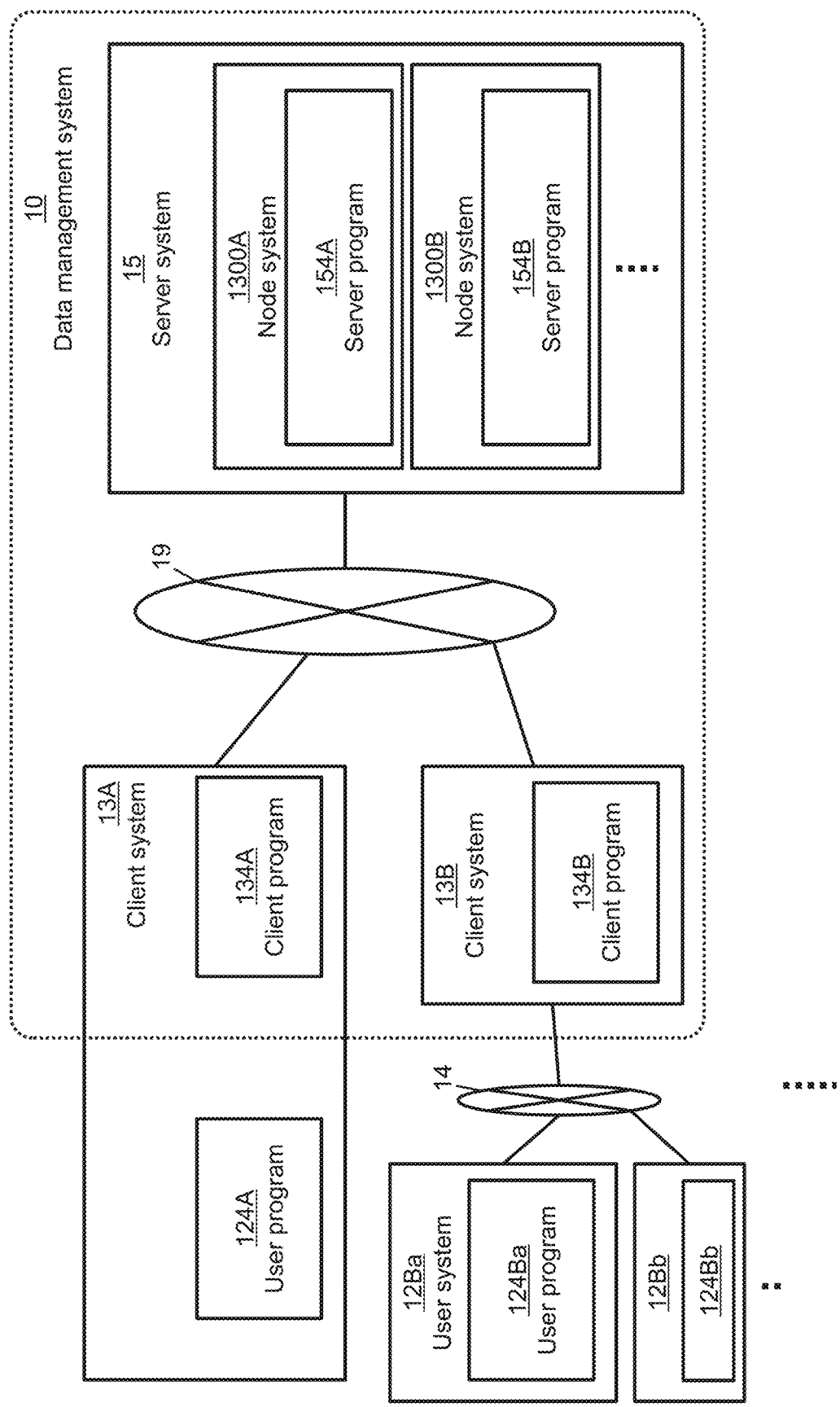
FIG. 3 illustrates a configuration example of the entire system according to the embodiment.

FIG. 3 illustrates an example of the configuration of the entire system according to the embodiment.

One or more client systems 13A, 13B, . . . , and a server system 15 are communicably coupled via a communication network 19. The server system 15 includes one or more node systems 1300A, 1300B, . . . .

The client system 13 executes a client program 134. There may be a client system 13 (e.g., the client system 13A) that executes not only the client program 134 but also a user program 124, or there may be a client system 13 (e.g., the client system 13B) that is connected via a communication network 14 to a user system 12 that executes a user program 124. The user system 12 may be a user's computer (e.g., a personal computer). The user program 124 may be a Web browser or an application program. The communication network 14 may be integrated with the communication network 19.

The data management system 10 includes a server program 154 executed by the node system 1300. The data management system 10 may include the client program 134 executed by each of the client systems 13A, 13B, . . . .

Figure 4:
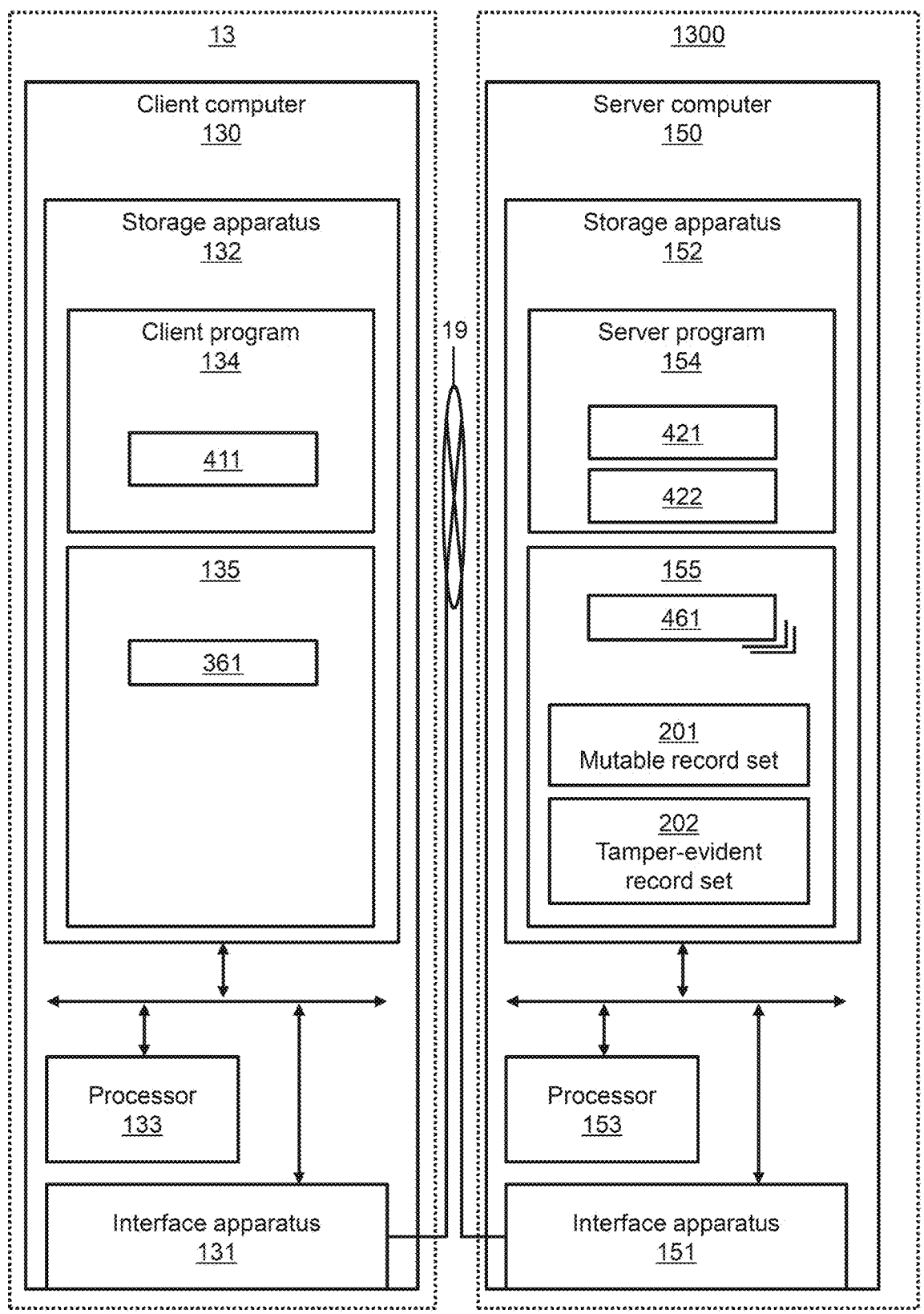
FIG. 4 illustrates an example of the configuration of a client system and a node system.

FIG. 4 illustrates an example of the configuration of the client system 13 and the node system 1300.

The client system 13 includes one or more client computers 130. The client system 13 may include only one client computer 130, and accordingly one client computer 130 may be one client system 13.

The client computer 130 includes an interface apparatus 131, a storage apparatus 132, and a processor 133 connected to them.

The interface apparatus 131 is connected to the communication network 19.

The storage apparatus 132 stores the client program 134 and client management data 135. The client management data 135 is data managed by the client computer 130. For example, the client management data 135 includes a private key 361. The private key 361 is a user's private key. In a case where the client computer 130 is shared by a plurality of users (e.g., a case where a plurality of user systems 12 are coupled to the client computer 130 via the communication network 14), a private key 361 is stored for each user. Note that the user may be an individual or an organization (e.g., a company or a financial institution).

The processor 133 executes the client program 134. The client program 134 is executed by the processor 133 to implement an issuing unit 411 that issues a status update request.

The node system 1300 includes one or more server computers 150. The server system 15 may include only one node system 1300 and the node system 1300 may include only one server computer 150, and accordingly one server computer 150 may be the server system 15. Therefore, the data management system 10 may be a system including one server program 154 in one server computer 150, or may be a system including one client program 134 in one client computer 130.

The server computer 150 includes an interface apparatus 151, a storage apparatus 152, and a processor 153 connected to them.

The interface apparatus 151 is connected to the communication network 19.

The storage apparatus 152 stores the server program 154 and server management data 155. The server management data 155 is data managed by the server computer 150. For example, the server management data 155 includes a public key 461, Mutable Record Set 201, and Tamper-evident Record Set 202. Mutable Record Set 201 and Tamper-evident Record Set 202 are data stored in the data management system 10, and may be distributed over one or more server computers 150.

The processor 153 executes the server program 154. The server program 154 is executed by the processor 153 to implement a reception unit 421 that receives a status update request and an execution unit 422 that executes status update processing of updating the status of the target specified in the status update request. The server program 154 may function as a DBMS (DataBase Management System), for example.

Figure 5:
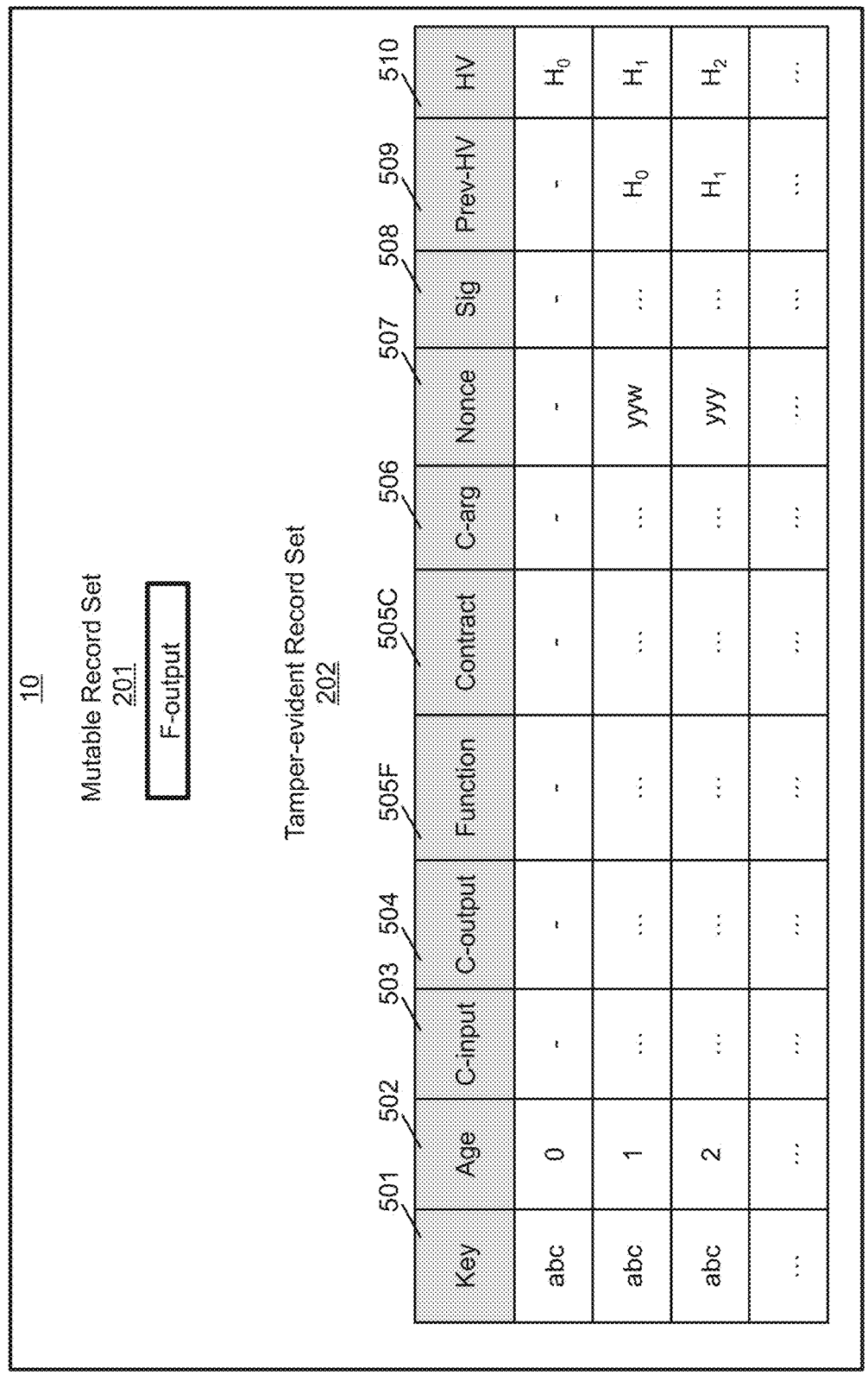
FIG. 5 illustrates a configuration example of Mutable Record Set and Tamper-evident Record Set.

FIG. 5 illustrates a configuration example of Mutable Record Set 201 and Tamper-evident Record Set 202. FIG. 5 illustrates parts for one target (key "abc") in each of Mutable Record Set 201 and Tamper-evident Record Set 202 for the sake of simplicity, but both a mutable record and a tamper-evident record exist for each target as described above.

The mutable record has an F-output. The F-output is data stored by executing Function, and represents the latest status of the target.

The tamper-evident record has information such as a key 501, an age 502, a C-input 503, a C-output 504, a Function 505F, a Contract 505C, a C-arg 506, a nonce 507, a Sig 508, a Prev-HV 509, and an HV 510.

The key 501 is the ID of the target. The age 502 represents the generation of a status of the target. Each time the status of the target is updated, a tamper-evident record with an incremented age 502 is added.

The C-input 503 represents the previous status of each of one or more targets including the target of interest. The C-output 504 represents the content of the processing performed by the execution of the Function. For example, in the case where the target is account A and the status update processing is a transfer of X yen from account A (an example of the target) to account B (an example of another target), the C-input 503 and the C-output 504 in the tamper-evident record added by the status update processing may be as follows.

The C-input 503 represents the latest balance of each of account A and account B (the C-input 703 can establish a record chain between the targets (tamper-evident record groups)).

The C-output 504 represents the processing content of a transfer of X yen from account A to account B.

The Function 505F is a reference to the Function (may be the Function itself). The Function is a processing logic (e.g., a function) that operates Mutable Record Set 201.

The Contract 505C is a reference to the Contract (may be the Contract itself). The Contract is a processing logic that operates Tamper-evident Record Set 202.

The Function and the Contract may be parts of the processing logic of an application of the data management system 10. The Function and the Contract may be deployed in at least one of the user system 12, the client system 13, and the server system 15. An electronic signature may be given to each of the Function and the Contract. The electronic signature may be an electronic signature using the user's private key 361.

In the present embodiment, the processing logic for operating Mutable Record Set 201 and the processing logic for operating Tamper-evident Record Set 202 are separate processing logics, but these processing logics may be defined as one processing logic.

The C-arg 506 is an argument group (one or more arguments) used for the Contract.

The nonce 507 is a nonce corresponding to the latest status (C-output 504) of the target. Specifically, the nonce 507 is a nonce associated with a status update request for status update processing in which the latest status is obtained.

The Sig 508 is an electronic signature using the private key 361 of the user who has issued the status update request. In the present embodiment, the Sig 508 is an electronic signature on an information set including the Function 505F, the Contract 505C and the C-arg 506. That information set may include other information such as the nonce 507.

The Prev-HV 509 is the same value as the HV 510 of the tamper-evident record of the previous generation of the target (i.e., the parent tamper-evident record). In other words, the link between the Prev-HV 509 and the HV 510 in the parent tamper-evident record establishes a record chain in the tamper-evident record group corresponding to the target.

The HV 510 is a summary of the Tamper-evident record of the target, for example, a hash value (hash value in which cryptographic collision is difficult) of at least part of information other than the HV 510 (all information 501 to 509 in the present embodiment).

As described above, a record chain is established between the C-inputs 503 in different tamper-evident record groups in Tamper-evident Record Set 202, and a record chain is established between the tamper-evident records in the same tamper-evident record group (Prev-HV 509 and HV 510). In this way, Tamper-evident Record Set 202 has a DAG structure. In Tamper-evident Record Set 202, a node is a tamper-evident record, and an edge represents a relationship between tamper-evident records in one or more status update processing.

Figure 6:
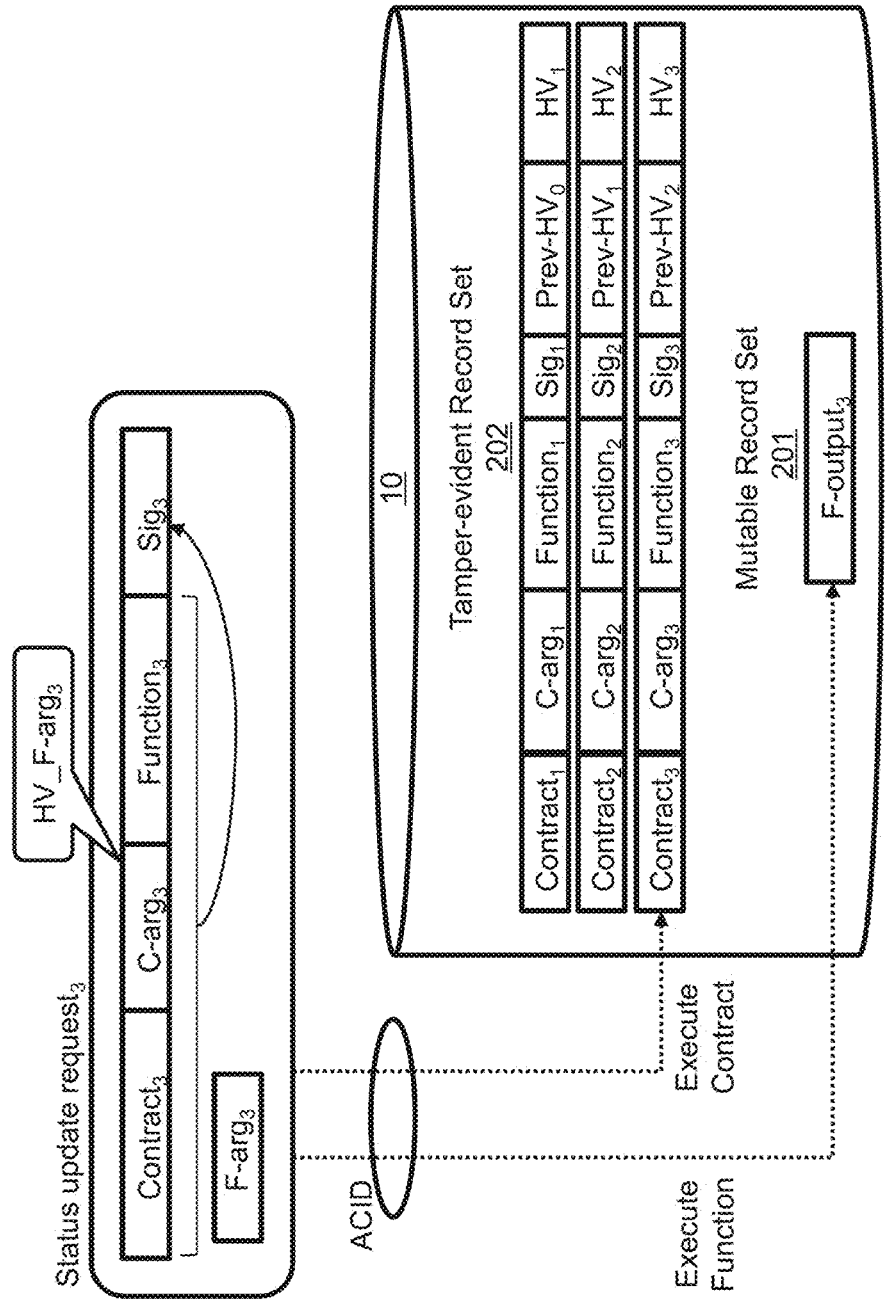
FIG. 6 schematically illustrates the outline of status update processing.

FIG. 6 schematically illustrates the status update processing.

For the sake of simplicity, one target (key "abc") is taken as an example. In the following description, C-output$_i$ is the C-output of Age "i" (i is an integer of 0 to N). Similarly, an element "AAA" corresponding to Age "i" is expressed as "AAA$_i$".

The Contract and the Function are both deployed in the server system 15 (or a system outside the server system 15) in advance. An electronic signature has been given to each of the Function and the Contract. Therefore, it is possible to detect that each of the Contract and the Function is tampered with. The status update request specifies a reference to the deployed Contract and a reference to the deployed Function.

It can be expressed that C-output$_i$=Contract$_i$(C-input$_i$, C-arg$_i$). In other words, C-output$_i$ is a result of executing Contract$_i$ using C-input$_i$ and C-arg$_i$. For i=0, C-output$_i$ is in an empty state, making it possible to detect that C-output$_0$ is tampered with. It is possible to detect that C-arg$_1$ is tampered with by using Sig$_1$ and also detect that Cotarct$_1$ is tampered with, so that it is possible to detect that C-output$_1$ is tampered with (it is possible to detect that a reference to Cotarct$_1$ is tampered with by using Sig$_1$ and detect that Cotarct$_1$ itself is tampered with by using an electronic signature on Cotarct$_1$ itself). Similarly, it is possible to detect that C-output$_i$ for i=2 to N is tampered with.

Similarly, it can be expressed that F-outoput$_i$=Function$_i$ (F-outoput$_{i-1}$, F-arg$_i$, C-arg$_i$). C-arg$_i$ includes HV_F-arg$_i$ (hash value of F-arg$_i$), and the detection whether F-arg$_i$ is tampered with is performed using C-arg$_i$.

Depending on the application, it may be expressed that C-output$_i$=Contract$_i$(C-arg$_i$) or F-outoput$_i$=Function$_i$(F-arg$_i$, C-arg$_i$). For example, C-output$_i$ may be a summary of the target in the latest status.

The reason why the arguments are separated like C-arg$_i$ and F-arg$_i$ is as follows. This is because when C-arg$_i$ is stored in the tamper-evident record and data with deletion requirement (e.g., privacy data) is included in the C-arg$_i$, then the data with deletion requirement is stored in the tamper-evident record, so that it becomes difficult to delete the data with deletion requirement.

Therefore, the separate arguments of C-arg$_i$ and F-arg$_i$ are given and HV_F-arg$_i$ (hash value of F-arg$_i$) is included in C-arg$_i$, so that it can be detected that F-arg$_i$ is tampered with. HV_F-arg$_i$ is an example of a summary of F-arg$_i$.

Taking i=3 as an example, the status update processing will be described with reference to FIG. 6. Note that, in FIG. 6, Prev-HV$_i$ in tamper-evident record$_i$ and HV$_{i-1}$ in tamper-evident record$_{i-1}$ are the same.

The issuing unit 411 (client program 134) issues target status update request$_3$ in which the target is specified, and the reception unit 421 (server program 154) receives status update request$_3$. Status update request$_3$ includes a reference to Contract$_3$, a reference to C-arg$_3$, a reference to Function$_3$, F-arg$_3$, and Sig$_3$.

Since Sig$_3$ is an electronic signature on the reference to Contract$_3$, the reference to C-arg$_3$, and the reference to Function$_3$, it is possible to detect that the reference to Contract$_3$, the reference to C-arg$_3$, and Function$_3$ are tampered with by using Sig$_3$. As described above, there is no electronic signature on F-arg$_3$.

The execution unit 422 (server program 154) executes status update processing of updating the status of the target specified in status update request$_3$. The status update processing includes first tamper-evidence processing, second tamper-evidence processing, and DB transaction processing.

The first tamper-evidence processing is processing of detecting whether the reference to Contract$_3$, C-arg$_3$, and Function, are tampered with by using Sig$_3$. Since C-arg$_3$ includes HV_F-arg$_3$, the first tamper-evidence processing includes detecting whether HV_F-arg$_3$ is tampered with. If no tampering is detected in the first tamper-evidence processing, the second tamper-evidence processing is performed.

The second tamper-evidence processing is processing of detecting whether F-arg$_3$ is tampered with by using HV_F-arg$_3$ in C-arg$_3$. The second tamper-evidence processing includes calculating a hash value of F-arg$_3$ and comparing the calculated hash value with HV_F-arg$_i$. If the calculated hash value and HV_F-arg$_3$ are different, it is detected that the F-arg$_i$ has been tampered with.

The DB transaction processing includes processing of updating Mutable Record Set 201 and Tamper-evident Record Set 202 in an ACID transactional manner, and specifically, includes the following steps.

Executing Function$_3$, that is, creating, reading, updating, or deleting the mutable record corresponding to the target specified in status update request$_3$ by using F-arg$_3$.

Executing Contract$_3$, that is, creating a new tamper-evident record by using C-arg$_3$ and adding the new tamper-evident record to Tamper-evident Record Set 202 (in executing Contract$_3$, reading a tamper-evident record may be performed instead of or in addition to creating in Tamper-evident Record Set 202). The added tamper-evident record includes the reference to Contract$_3$, C-arg$_3$, the reference to Function$_3$, Sig$_3$, Prev-HV$_3$ (the same hash value as HV$_2$), and HV$_3$ (hash value of information set including the reference to Contract$_3$, C-arg$_3$, the reference to Function$_3$, Sig$_3$, and Prev-HV$_3$).

Figure 7:
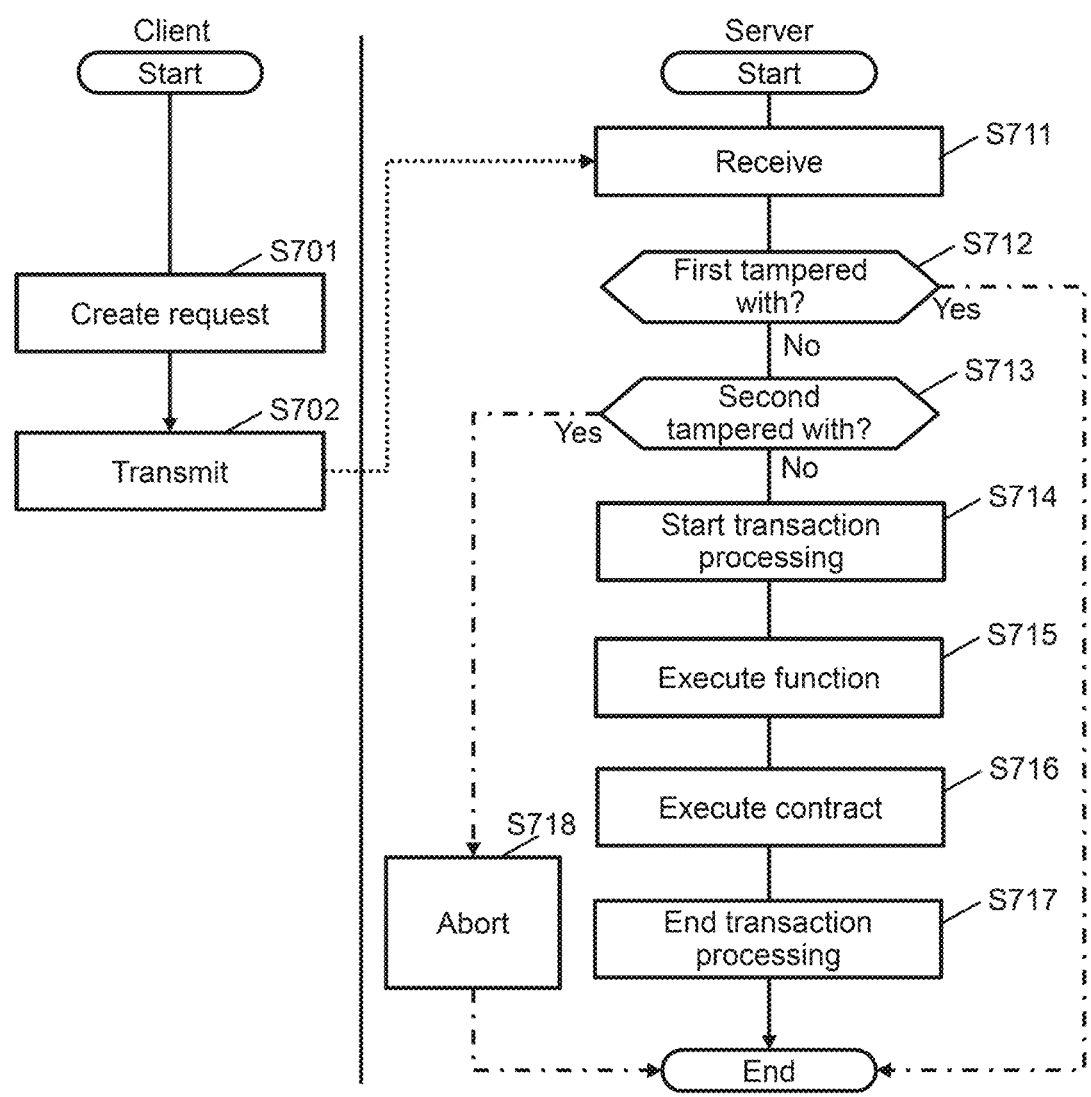
FIG. 7 illustrates the flow of an example of processing performed in the embodiment.

FIG. 7 illustrates the flow of an example of processing performed in the embodiment.

The issuing unit 411 (client program 134) creates status update request$_i$ including a reference to Contract$_i$, C-arg$_i$, a reference to Function$_i$, F-arg$_i$, and Sig$_i$ (S701). Sig$_i$ is a digital signature on the reference to Contract$_i$, C-arg$_i$, and the reference to Function$_i$ and is created using the user's private key 361.

The issuing unit 411 transmits status update request$_i$ created in S701 (S702).

The reception unit 421 (server program 154) receives status update request$_i$ (S711). The execution unit 422 (server program 154) performs the first tamper-evidence processing (S712). The first tamper-evidence processing is processing of detecting whether the reference to Contract$_i$, C-arg$_i$, and the reference to Function$_i$ in status update request$_i$ are tampered with by using Sig$_i$ in status update request$_i$. In this processing, the user's public key 461 may be used. When tampering is detected in S712 (S712: Yes), for example, the execution unit 422 returns an error as a response to status update request$_i$ and ends the processing.

When tampering is not detected in S712 (S712: No), the execution unit 422 performs the second tamper-evidence processing (S713). The second tamper-evidence processing is processing of detecting whether F-arg$_i$ is tampered with by calculating a hash value of F-arg$_i$ and comparing the calculated hash value with HV_F-arg$_i$ in C-arg$_i$. When it is detected that F-arg$_i$ is tampered with (S713: Yes), for example, the execution unit 422 aborts the transaction (S718).

When it is not detected that F-arg$_i$ is tampered with in S713 (S713: No), the execution unit 422 starts the DB transaction processing (S714). For example, the execution unit 422 executes Begin.

The execution unit 422 executes Function$_2$ (S715). In the execution of Function$_i$, the execution unit 422 creates, reads, updates, or deletes the mutable record by using F-arg$_i$.

The execution unit 422 executes Contract$_i$ (S716). In executing Contract$_i$, the execution unit 422 creates a new tamper-evident record by using C-arg$_i$, and adds the new tamper-evident record to Tamper-evident Record Set 202 (reading may be performed instead of creating).

The execution unit 422 ends the transaction processing (S717). For example, the execution unit 422 executes Commit.

In the description of FIG. 7, at least one of the following may be adopted.
- At least one of the first tamper-evidence processing and the second tamper-evidence processing may be performed between the start and the end of the transaction processing.
- Executing Contract$_i$ may be performed before executing Function$_i$.
- Expressions other than Begin and Commit may be adopted as expressions for the start and end of transaction processing.
- In status update request$_i$ and tamper-evident record$_i$, HV_F-arg$_i$ may be outside C-arg$_i$, and there may be an electronic signature on HV_F-arg$_i$ in addition to Sig$_i$.

As described above, according to the present embodiment, Mutable Record Set 201 and Tamper-evident Record Set 202 are updated in an ACID transitional manner. Therefore, in addition to the update or delete of data, improvement of searchability, and guarantee of tamper-evidence, it is possible to maintain the consistency between Mutable Record Set 201 and Tamper-evident Record Set 202.

Further, according to the present embodiment, it is difficult to restore the status represented by the deleted mutable record (e.g., privacy data having deletion requirement) from either Mutable Record Set 201 or Tamper-evident Record Set 202. This is because there is no deleted mutable record in Mutable Record Set 201, and there is an HV_F-arg which is the hash value of an F-arg in Tamper-evident Record Set 202, but it is difficult to identify the F-arg from the HV_F-arg.

Further, according to the present embodiment, there is no electronic signature on F-arg$_i$ in state update request$_i$, but HV_F-arg$_i$ is included in C-arg$_i$ and there is Sig$_i$ on C-arg$_i$, so that it can be detected whether F-arg$_i$ is tampered with.

While one embodiment has been described above, such an embodiment is an example for describing the present invention and is not intended to limit the scope of the present invention to the embodiment. The present invention can be implemented even in various other forms.

REFERENCE SIGNS LIST

10 Data management system

The invention claimed is:

1. A data management system comprising:
a server computer comprising a processor and a storage apparatus that stores:
   a reception unit that receives a status update request in which a target is specified; and
   an execution unit that executes status update processing of updating a status of the target specified in the status update request, wherein
the status update processing includes transaction processing that is processing of updating first information and second information in an ACID (Atomicity, Consistency, Isolation, Durability) transactional manner,
the first information is a first object group for the target,
the first object group is one or more first objects,
a first object from among the one or more first objects is mutable data that represents the status of the target,
the second information is a second object group for the target,
the second object group is one or more second objects,
a second object from among the one or more second objects is tamper-evident data,
the transaction processing includes:
   first processing of creating, updating, or deleting the first object corresponding to the specified target, and
   second processing of adding the second object including at least one of a content of the first processing and a summary of the first object to the second object group corresponding to the specified target,
the status update request includes:
   a first argument group that is one or more arguments used for the first processing,
   an argument group summary that is a summary of the first argument group, and
   an electronic signature on the argument group summary, and
the execution unit executes:
   first tamper-evidence processing of detecting whether the argument group summary in the status update request is tampered with, by using the electronic signature in the status update request,
   second tamper-evidence processing of, when no tampering is detected in the first tamper-evidence processing, detecting whether the first argument group in the status update request is tampered with, by using the argument group summary where the no tampering is detected, and
   the transaction processing, when no tampering is detected with the first argument group in the second tamper-evidence processing, which includes the first processing using the first argument group in the status update request and the second processing.

2. The data management system according to claim 1, wherein
the first information and the second information are information included in a database, and the transaction processing is transaction processing of the database.

3. A data management method comprising:
receiving, by a data management system, a status update request in which a target is specified, wherein
the status update request includes:
a first argument group that is one or more arguments used for first processing,
an argument group summary that is a summary of the first argument group, and
an electronic signature on the argument group summary,
executing, by the data management system, first tamper-evidence processing of detecting whether the argument group summary in the status update request is tampered with, by using the electronic signature in the status update request,
executing, by the data management system, second tamper-evidence processing of, when no tampering is detected in the first tamper-evidence processing, detecting whether the first argument group in the status update request is tampered with, by using the argument group summary where the no tampering is detected, and
executing, by the data management system, status update processing of updating a status of the target specified in the status update request, when no tampering is detected with the first argument group in the second tamper-evidence processing, wherein
the status update processing includes transaction processing that is processing of updating first information and second information in an ACID (Atomicity, Consistency, Isolation, Durability) transactional manner,
the first information is a first object group for the target,
the first object group is one or more first objects,
a first object from among the one or more first objects is mutable data that represents the status of the target,
the second information is a second object group for the target,
the second object group is one or more second objects, and
a second object from among the one or more second objects is tamper-evident data,
the transaction processing includes
first processing of creating, updating, or deleting the first object corresponding to the specified target, and
second processing of adding the second object including at least one of a content of the first processing and a summary of the first object to the second object group corresponding to the specified target.

4. A computer program product comprising a non-transitory storage medium that stores instructions which cause a computer to execute:
receiving a status update request in which a target is specified,
the status update request including:
a first argument group that is one or more arguments used for first processing,
an argument group summary that is a summary of the first argument group, and
an electronic signature on the argument group summary;
executing first tamper-evidence processing of detecting whether the argument group summary in the status update request is tampered with, by using the electronic signature in the status update request;
executing second tamper-evidence processing of, when no tampering is detected in the first tamper-evidence processing, detecting whether the first argument group in the status update request is tampered with, by using the argument group summary where the no tampering is detected; and
executing status update processing of updating a status of the target specified in the status update request, when no tampering is detected with the first argument group in the second tamper-evidence processing, wherein
the status update processing includes transaction processing that is processing of updating first information and second information in an ACID (Atomicity, Consistency, Isolation, Durability) transactional manner,
the first information is a first object group for the target,
the first object group is one or more first objects,
a first object from among the one or more first objects is mutable data that represents the status of the target,
the second information is a second object group for the target,
the second object group is one or more second objects, and
a second object from among the one or more second objects is tamper-evident data, the transaction processing includes:
first processing of creating, updating, or deleting the first object corresponding to the specified target, and
second processing of adding the second object including at least one of a content of the first processing and a summary of the first object to the second object group corresponding to the specified target.

* * * * *